US006897823B2

(12) United States Patent
Iida et al.

(10) Patent No.: US 6,897,823 B2
(45) Date of Patent: May 24, 2005

(54) PLANE ANTENNA AND METHOD FOR MANUFACTURING THE SAME

(75) Inventors: Tamotsu Iida, Ibaraki (JP); Eiji Koyama, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 66 days.

(21) Appl. No.: 10/207,991

(22) Filed: Jul. 31, 2002

(65) Prior Publication Data

US 2004/0021611 A1 Feb. 5, 2004

(30) Foreign Application Priority Data

Jul. 31, 2002 (JP) ....................................... 2001-231193

(51) Int. Cl.[7] ................................................ H01G 13/10
(52) U.S. Cl. ................................ 343/770; 343/700 MS
(58) Field of Search .......................... 343/770, 700 MS, 343/873, 846, 702; 29/600

(56) References Cited

U.S. PATENT DOCUMENTS 5,266,961 A 11/1993 Milroy ....................... 343/772
6,006,419 A * 12/1999 Vandendolder et al. ....... 29/600
6,147,660 A * 11/2000 Elliott ........................ 343/895
6,150,982 A * 11/2000 Bergstedt et al. ..... 343/700 MS
6,486,852 B1 * 11/2002 Hirose et al. ............... 343/895
6,531,983 B1 * 3/2003 Hirose et al. ........ 343/700 MS

FOREIGN PATENT DOCUMENTS

| | | |
|---|---|---|
| JP | 56-32807 | 4/1981 |
| JP | 3-157004 | 7/1991 |
| JP | 3-171802 | 7/1991 |
| JP | 5-283931 | 10/1993 |
| JP | 6-77723 | 3/1994 |
| JP | 06-140830 | 5/1994 |
| JP | 6-164234 | 6/1994 |
| JP | 08-325440 | 12/1996 |
| JP | 09-041137 | 2/1997 |
| JP | 9-275310 | 10/1997 |
| JP | 2000-228603 A | 8/2000 |
| JP | 2000-312111 | 11/2000 |
| JP | 2001-143531 | 5/2001 |

* cited by examiner

*Primary Examiner*—James Vannucci
(74) *Attorney, Agent, or Firm*—Birch, Stewart, Kolasch & Birch, LLP

(57) ABSTRACT

A method for manufacturing a plane antenna that coats dielectric with conductor and forms a pattern free of the conductor on a surface of the dielectric which is otherwise coated with conductor includes the step of molding the dielectric and the pattern through injection molding using a mold that has the pattern.

8 Claims, 13 Drawing Sheets

PLANE ANTENNA AND METHOD FOR MANUFACTURING THE SAME

BACKGROUND OF THE INVENTION

The present invention relates antennas and methods for manufacturing the same, and more particularly to a method for manufacturing a slot pattern in an antenna. The present invention is suitable for a plane antenna for use with a frequency band of 50 GHz or higher in a wave guiding space.

The recent highly information-oriented society has universally utilized radio communication systems, and drastically developed them particularly in the microwave and millimeter wave ranges that may transmit large information content. A plane antenna is a suitable input/output ("I/O") device for short-wavelength radio system among these communication systems, and is expected applicable to many fields including radio LANs and automobile collision prevention radars. The antenna size should correspond to a wavelength of an electric or electromagnetic wave, and should be required smaller as the I/O device for shorter wavelengths. Thereby, the fine process has been required for the recent antenna to maintain its size accuracy.

Conventional antennas include, for example, a dielectric antenna disclosed in Japanese Laid-Open Patent Application No. 56-32807 and a continuous stub antenna disclosed in Japanese Laid-Open Patent Application No. 6-77723.

However, it has become difficult to for conventional manufacturing methods to precisely and cost-efficiently provide plane antennas. The conventional methods rely upon the etching technology to form, for example, a slot pattern and patch pattern in an antenna, and the fine process drastically affects antenna characteristics. However, the etching technology cannot precisely produce the pattern disadvantageously. In particular, the size accuracy in the millimeter wave range requires 1% or higher of the wavelength and, for example, several tens of micrometers for 50 GHz. When a multiplicity of resonant slots and patch patterns are arrayed, stricter size accuracy control is required to maintain directivity. For this demand it is conceivable to apply the fine processing technology that has been usually used for the LSI fabrications, but this technology cannot provide inexpensive antennas.

The conventional plane antenna has formed a slot, for example, using etching. As shown in sectional view of a pattern in FIG. 14A, the conventional plane antenna 300 coats conductor 320 on plate dielectric 310, and forms a slot at a portion (or a concave) uncoated by the conductor 320. Here, FIG. 14A is a schematic, partially sectional view near a surface of the conventional plane antenna. As shown, the conductor 320 defines the slot 330. However, the conductor 320 erodes, as shown in FIG. 14B, when water 340 is collected in the concave 330 and, as indicated by broken lines, deteriorates and turns into the conductor 320A as shown in FIG. 14C. As it is understood from a comparison between an arrow between the broken lines and an arrow between the solid lines, an interval of the slot 330 changes and the plane antenna 300 varies its property. Here, FIG. 14B is a schematic sectional view showing that the water 340 is collected in the slot 330 shown in FIG. 14A, and FIG. 14C is a schematic sectional view of changing widths of the slot 330 in the plane antenna 300 as a result of FIG. 14B.

The antenna disclosed in Japanese Patent Application No. 56-32807 has, as shown in FIG. 6(*d*), a flat conductor around a slot, thereby easily collecting water and resulting in erosion of the slot. As a result, the slot width varies as discussed above. The antenna disclosed in Japanese Laid-Open Patent Application No. 6-77723 is a continuous cross stub device that has a long slot extending in one direction without the resonant slot. The stub device may maintain the antenna property even when the slot partially erodes in its longitudinal direction and the slot interval changes in one part, because the slot interval in other parts does not change. Therefore, this stub device is relatively corrosion resistant. However, another and separate countermeasures should be taken for such an antenna that is required to be corrosion resistant in a slot's longitudinal direction, such as a plane antenna having a resonant slot.

BRIEF SUMMARY OF THE INVENTION

In order to solve the above disadvantages, it is a general object of the present invention to provide a novel and useful plane antenna and a method for manufacturing the same.

More specifically, it is an exemplary object of the present invention to provide an inexpensive plane antenna that has good size accuracy and productivity, and a method for manufacturing the same.

Another exemplary object of the present invention is to provide a plane antenna that may maintain its property under environmental changes over time, such as corrosion, and a method for manufacturing the same.

In order to achieve the above objects, a method of one aspect of the present invention for manufacturing a plane antenna that coats dielectric with conductor and forms a pattern free of the conductor on a surface of the dielectric which is otherwise coated with conductor includes the step of molding the dielectric and the pattern through injection molding using a mold that has the pattern. This manufacturing method uses the injection molding to simultaneously mold the pattern free of the conductor together with the dielectric, and forms the pattern integrated with the dielectric with accuracy of micron order. This pattern may serve, for example, as a slot or patch in the plane antenna, and realize an accurately manufactured small antenna suitable for short wavelengths. In addition, the injection molding for producing the dielectric would enable the antenna to be inexpensively mass-produced once a mold is prepared for the dielectric having the predetermined pattern. The predetermined pattern formed by the molding step may have a convex or concave section, and the region coated with the conductor may have a convex or concave section.

The method may further include the steps of forming the conductor on the dielectric formed by the molding step, and removing the conductor from the portion patterned. These steps enable the pattern (i.e., slot or patch) to serve as an electric antenna pattern after forming the conductor on the molded dielectric, and removing the conductor from the patterned portion.

The method may further include the steps of forming a first conductor film on the dielectric formed by the molding step, using electroless plating, evaporation or sputtering, and forming a second conductor film on the dielectric on which the first conductor film has been formed by the forming step. This manufacturing method may form a conductor film on the molded dielectric. As an example, the second conductor film may be formed by electroplating, and the step of forming the second conductor film may control a film thickness of the second conductor film formed by the electroplating. The film thickness of the second conductor is controllable such that the second conductor has an appropriate thickness suited to meet the skin effect as the electromagnetic property. When the pattern has a concave shape, the step of forming the first conductor film may use evaporation or sputtering, and include the step of arranging a patterned surface oblique to an ejection direction of a material of the conductor in the evaporation or sputtering. Thereby, when the pattern has a concave section from which the conductor is hard to be removed, the conductor is prevented from forming a film when the conductor film is formed. The step of forming the second conductor film may use, for example, evaporation or sputtering of aluminum, copper, silver, nickel, etc.

When the predetermined pattern has a concave section, the method may further include the steps of embedding a predetermined material into the predetermined pattern of the dielectric formed by the forming step, forming the conductor in the dielectric into which the predetermined material has been embedded, removing the predetermined material from the predetermined pattern so as to peel off the conductor from the predetermined pattern. Similar to the above, this manufacturing method may form the conductor on the dielectric so as not to form the conductor on the predetermined pattern having the concave section as an electric pattern. The predetermined material may be solid at the room temperature, and have such property that it vaporizes and expands when heated above the room temperature, and the step of peeling off has the step of heating the dielectric on which the conductor has been formed. This step heats the dielectric into which the predetermined material has been embedded and on which the conductor has been formed. As a result, the predetermined material swells and peels off the conductor film formed in the predetermined step. For example, the predetermined material is petrolatum.

A plane antenna of another aspect of the present invention is manufactured by the above method. This plane antenna exhibits the operations similar to those of the above manufacturing method. The instant invention may be also directed to the plane antenna manufactured by the above method.

A plane antenna of another aspect of the present invention includes a plate dielectric and a conductor that coats a surface of the dielectric, the plate antenna forming a resonant slot of a predetermined pattern at a predetermined position uncovered with the conductor, wherein the dielectric has a convex section at the predetermined position, and wherein the conductor is arranged approximately as high as the dielectric around the dielectric having the convex section and forms a convex section together with the dielectric having the convex section. This plane antenna does not easily erode, because the conductor is approximately level with the dielectric at the resonant slot, and the resonant does not usually collect water due to the convex section. As a result, the plane antenna has good weather resistance and maintains stable property for a long time.

Alternatively, the dielectric has a convex section at the predetermined position, and the conductor is arranged around and adhered to the dielectric having the convex section, and forms a convex section together with the dielectric having the convex section. The plane antenna maintains water resistance and stable property due to adherence. A plasma process would enhance the adherence between the dielectric and the conductor.

Alternatively, the dielectric is made of a water repellent material and has a convex section at the predetermined position, wherein the conductor is arranged around the dielectric having the convex section forms a convex section together with the dielectric having the convex section. This plane antenna may enhance the water resistance and corrosion resistance due to the water repellent material (such as resin having a low dielectric constant). The resin having a low dielectric constant does not generally have a hydrophilic polar group in a molecule, and is hydrophobic due to the small saturation moisture absorption. It is not porous and thus more water repellent than inorganic materials, such as alumina. Concrete materials include fluorocarbon resin such as ethylene-tetrafluoroethylene copolymer, aromatic series resin, such as polystylene, and polyolefine resin, such as polypropylene, polyethylene, polymethylpentene, and norbornene. Hydrocarbon resin is particularly preferable for cost and processing purposes. A filler and fiber sheet, such as silicon dioxide, may be blended for adjustment of a coefficient of thermal expansion. Dimethanonaphthalene resin is preferable for use with high frequency of 50 GHz or higher.

The dielectric may be made of a material having a coefficient of water absorption of 0.01% or less, and have a convex section at the predetermined position, wherein the conductor is arranged around the dielectric having the convex section, and forms a convex section together with the dielectric having the convex section. This plane antenna is made of the material having a coefficient of water absorption of 0.01% or less, and may enhance the water resistance and corrosion resistance.

The dielectric may be made of a material having a coefficient of thermal expansion of $7\times10^{-5}$ or less, and has a convex section at the predetermined position, wherein the conductor is arranged around the dielectric having the convex section forms a convex section together with the dielectric having the convex section. This plane antenna is made of the material having a coefficient of thermal expansion of $7\times10^{-5}$ or less, and may enhance the water resistance and corrosion resistance.

The dielectric may have a pillar shape with a convex section at the predetermined position, wherein the conductor is arranged around the dielectric having the convex section, and forms a convex section together with the dielectric having the convex section. Even when the conductor near the antenna slot erodes, the pillar-shaped convex dielectric (having the approximately constant sectional area) may maintain the slot shape and thus stable property for a long time.

A plane antenna of another aspect of the present invention includes a plate dielectric and a conductor that coats a surface of the dielectric, the plate antenna forming a resonant slot of a predetermined pattern at a predetermined position on the dielectric uncovered with the conductor, wherein the plane antenna serves as an array antenna that two-dimensionally arranges a multiplicity of isolated convexes for forming the predetermined pattern at the predetermined position on the dielectric. This plane antenna may maintain a shape and size of each pattern, and positional relationship among the patterns. Therefore, the plane antenna does not easily cause positional offsets among its predetermined patterns, and may maintain the antenna property irrespective of environmental changes. This plane antenna is suitable especially for as an array antenna for use with high frequency of 50 GHz or higher.

A plane antenna of still another aspect of the present invention includes a plate dielectric and a conductor that coats a surface of the dielectric, the plate antenna forming a resonant slot of a predetermined pattern at a predetermined position on the dielectric uncovered with the conductor, wherein the dielectric has a first surface and a second surface opposite to the first surface, wherein the first surface forms a multiplicity of predetermined patterns each having a convex section at the predetermined position on the dielectric, and wherein the second surface forms and coats with the conductor a pattern around a center which corresponds to a center of the multiplicity of predetermined patterns, a tip of the pattern in the second surface being free of the conductor and exposing as a gate for an electromagnetic signal the dielectric. Preferably, the pattern formed in the second surface has a concave or convex section for feeder matching. This plane antenna accords centers between two patterns with each other, fixes a distance from the feeding center to the radiation pattern, and controls a difference of relative phases among array antenna elements, maintaining tie stable property. In particular, when the convex or concave feeder would be able to realize impedance matching between the feeder and antenna patterns using this shape.

A plane antenna of another aspect of the present invention includes a plate dielectric and a multiplicity of patterned, conductor coated concave portions two-dimensionally arranged on a surface of the dielectric, no conductor coated film being provided except for the concave portions and thus the dielectric exposing and forming a resonant patch so that the plane antenna may serve as an array antenna. This plane antenna may flatten the conductor coated concave surface, fill the low moisture absorptive resin in the concave, and maintain the stable property under environmental changes.

A plane antenna of another aspect of the present invention includes a plate dielectric and a conductor that coats a surface of the dielectric, the plate antenna forming a resonant slot of a predetermined pattern at a predetermined position on the dielectric uncovered with the conductor, wherein the dielectric has a convex section at the predetermined position, wherein the conductor is arranged approximately as high as the dielectric around the dielectric having the convex section, and forms a convex section together with the dielectric having the convex section, and wherein $d \leqq h \leqq \lambda g/10$ is satisfied where d is a thickness of the conductor at a location other than the predetermined position, $\lambda g$ is a wavelength of an electric wave, and h is a height of the dielectric having the convex section. The height h equal to or less than $\lambda g/10$ would limit a phase offset of the electromagnetic wave emitted from the convex, and provide the antenna property with sharp directivity. The convex is higher than the thickness d of the coating conductor so that it may not become a concave. When the frequency of the electric wave is within a band of 50 GHz or higher, for example, the plane antenna may set the thickness of the coating conductor to be 3 $\mu$m fully taking the electromagnetic skin effect into consideration.

A plane antenna of another aspect of the present invention includes a plate dielectric and a conductor that coats a surface of the dielectric, the plate antenna forming a resonant slot of a predetermined pattern at a predetermined position on the dielectric uncovered with the conductor, wherein the dielectric has a convex section at the predetermined position, wherein the conductor is arranged approximately level with the dielectric around the dielectric having the convex section, and forms a convex section together with the dielectric having the convex section, and wherein 25 $\mu m \leqq h \leqq 250$ $\mu$m is satisfied where h is a height of the dielectric having the convex section. This plain antenna indicates h in the absolute value in the millimeter range, and exhibits similar operations as the above plane antenna.

Alternatively, the dielectric has a first surface and a second surface opposite to the first surface, wherein the first surface forms as a radiation array pattern the predetermined pattern of a convex section at the predetermined position on the dielectric, and wherein the second surface forms a feeder of another pattern having a center that offsets from a portion within $\lambda/50$ which corresponds to a center of the radiation array patterns. This plane antenna forms an array, and restrains the phase offset of the radiation electromagnetic wave from each antenna element on the convex surface (i.e., a resonant slot) within a permissible range by taking a distance from the feeding center into consideration. This would properly adjust the radiation pattern for the entire antenna, which is formed by synthesizing these radiation electromagnetic waves, and provide the antenna with sharp directivity.

A plane antenna of still another aspect of the present invention includes a plate dielectric and a conductor that coats a surface of the dielectric, the plate antenna forming a resonant slot of a predetermined pattern at a predetermined position on the dielectric uncovered with the conductor, wherein the dielectric has a first surface and a second surface opposite to the first surface, wherein the first surface forms the predetermined pattern of a convex section at the predetermined position on the dielectric, and wherein the second surface forms a feeder of a convex section. This plane antenna provides the feeder to a concave or convex base that forms the antenna radiation part, realizing the impedance matching between the antenna radiation part and feeder, and thus enhancing the antenna efficiency. The integrated molding with the dielectric would make the manufacture efficient.

A method of another aspect of the present invention for manufacturing a plane antenna comprising a plate dielectric and a conductor that coats a surface of the dielectric, the plate antenna forming a resonant slot or patch pattern of a predetermined pattern at a predetermined position on the dielectric uncovered with the conductor includes the steps of filling, hardening, and molding a material of the dielectric in a mold having an uneven part corresponding to the resonant slot or patch pattern so that the predetermined pattern may be defined as the convex section of the dielectric, coating the surface of the dielectric with the conductor, and molding the resonant slot or patch pattern by removing the dielectric and the conductor at the predetermined position. This method may establish all the slot sizes, and a positional relationship among the antenna elements and feeder with accuracy.

Other objects and further features of the present invention will become readily apparent from the following description of preferred embodiments with reference to accompanying drawings.

BRIEF DESCRIPTION OF THE DRAWINGS

FIG. 13C is a sectional view of FIG. 13B.

DETAILED DESCRIPTION OF THE PREFERRED EMBODIMENTS

Figure 1:
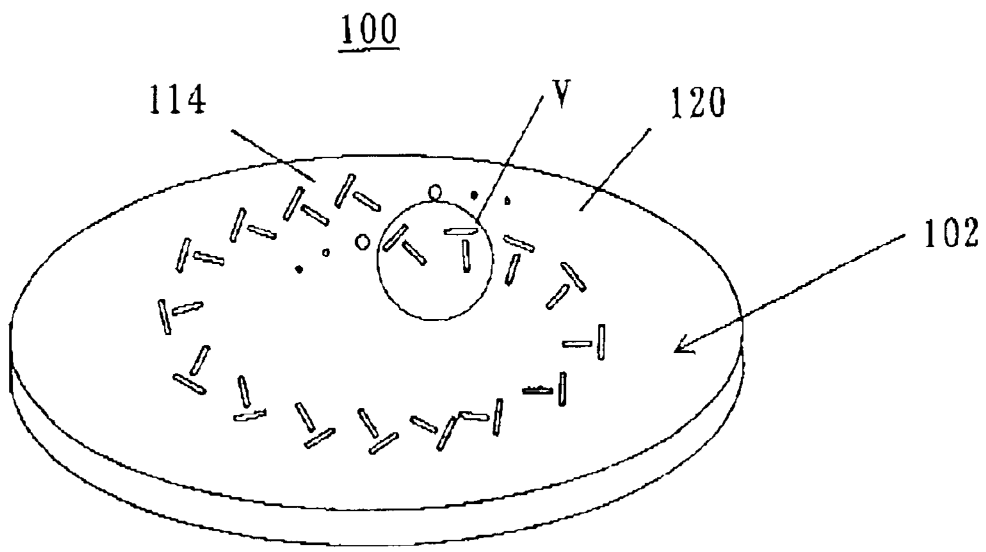
FIG. 1 is a schematic perspective view of one surface of a plane antenna according to the present invention.
Figure 2:
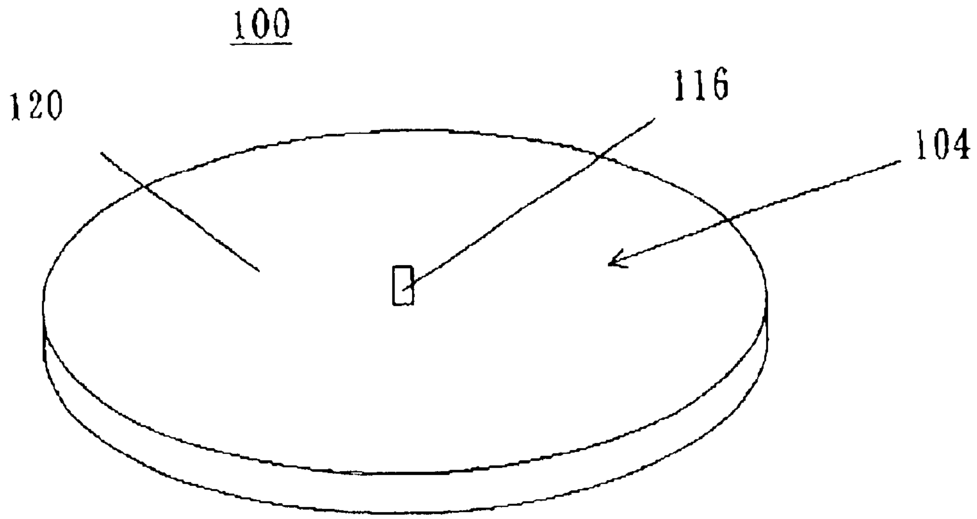
FIG. 2 is a schematic perspective view of another surface of the plane antenna shown in FIG. 1

With reference to the accompanying drawings, a description will now be given of an optical disc 100 of the present invention. In each figure of the accompanying drawings, the same reference numeral denotes the same element and a description thereof will be omitted. Here, FIG. 1 is a schematic perspective view of a front surface of a plane antenna 100. FIG. 2 is a schematic perspective view of a rear surface of a plane antenna 100. FIG. 3A is a schematic sectional view of the plane antenna 100. FIG. 3B is a partially enlarged sectional view of the plane antenna 100. The plane antenna 100 includes a base 110 made of plate dielectric, and a conductor (film) 120 for coating the surface of the base 110, and forms one or more resonant slots of a predetermined pattern at predetermined positions on the base 110, uncovered with the conductor 120.

Figure 3:
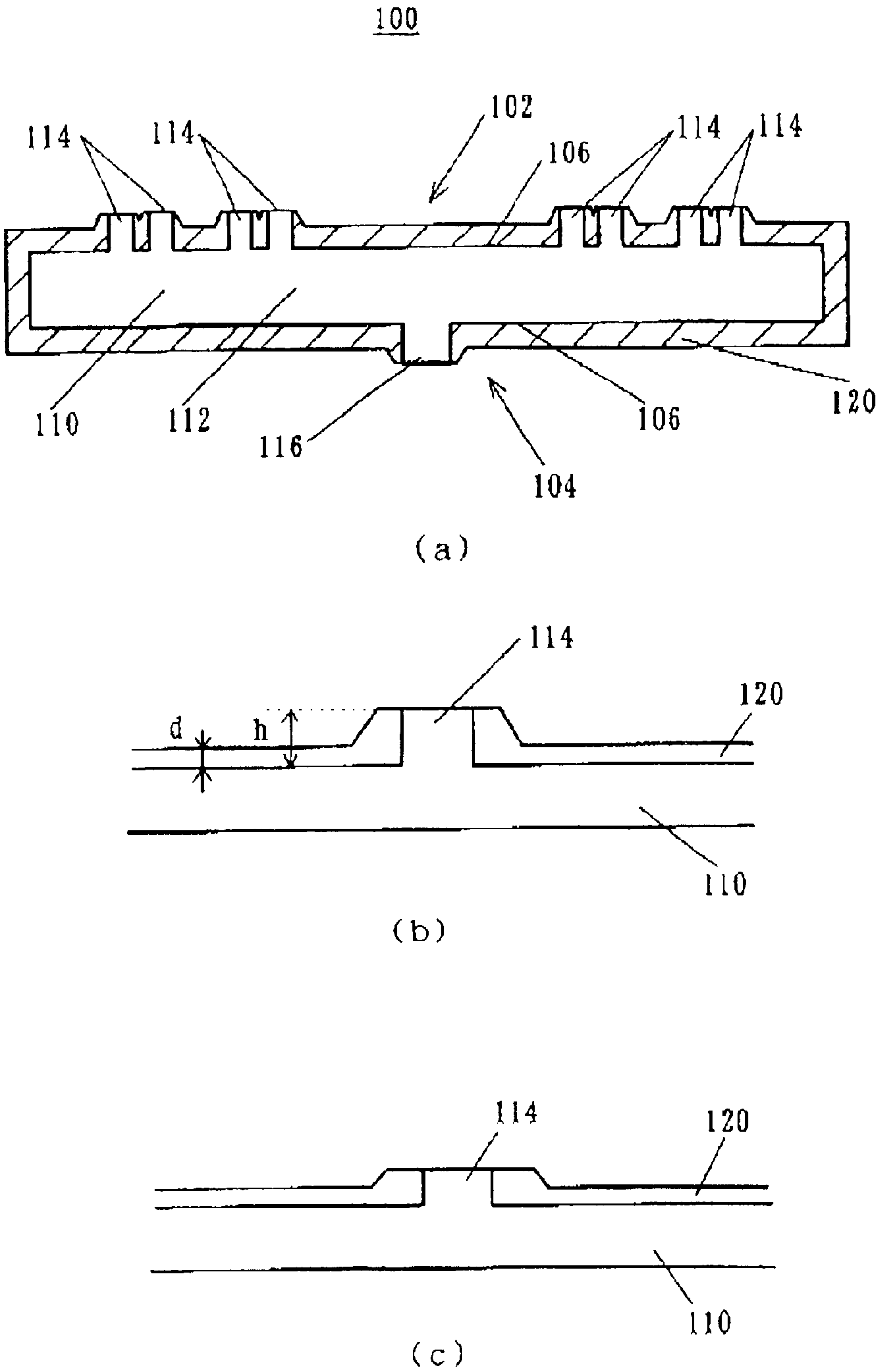
FIG. 3 is a schematic sectional view of the plane antenna shown in FIG. 1.

As shown in FIG. 3A, the plane antenna 100 includes the base 110 and the conductor film 120, and the conductor 120 is formed with a predetermined thickness on the base 110 with taking the skin effect into consideration. The plane antenna 100 does not form the conductor 120 at predetermined areas (i.e., slot patterns 114 and feeding slot pattern 116, which will be described later), and serve as an antenna when these areas are formed as one or more slots. FIGS. 1 through 3 exaggerate and partially omit slot patterns 114 and feeding slot pattern 116 in order to assist understanding of the plane antenna 100.

The plane antenna 100 exemplarily includes a disc shape with a diameter of 30 to 50 mm and a thickness of 1 mm, and is implemented as a small radial slot antenna. However, the inventive plane antenna 100 is not limited to this type, and applicable to any antenna of any size, such as a patch antenna and a micro strip antenna, only if it has a dielectric area free of the conductor on the conductor coated surface 106. The small plane antenna 100 may be manufactured with high accuracy.

The base 110 has a predetermined thickness, which thickness serves as a wave-guide path and thus a feeder circuit for each slot. The base 110 has a base body 112, plural slot patterns 114, and a feeding slot pattern 116. The instant specification defines as a conductor coated surface 106 a portion forming the conductor film 120 except for the slot patterns 114 of the base 110 and the feeding slot pattern 116. As shown in FIGS. 1–3, the plane antenna 100 forms the convex slot patterns 114 at a front surface (emitting surface) 102 side, and the convex, feeding slot pattern 116 at a rear surface (feed surface) 104 side, and both patterns 114 and 116 are integrated with the base 110.

Alternatively, the feeding slot pattern 116 may be formed as a concave shape. As shown in FIGS. 1 and 2, the base 110 has different patterns (i.e., slot patterns 114 and feeding slot pattern 116) between the front and rear surfaces (i.e., the emitting surface 102 and electric power surface 104). As discussed in a manufacturing method, the alignment is needed between the front and rear patterns (i.e., slot patterns 114 and feeding slot pattern 116). Therefore, the base 110 may separately mold a front pattern molded base (i.e., a base having the slot patterns 114), and a rear pattern molded base (i.e., a base having the feeding slot pattern 116), and then stick both bases together so as to integrate them with each other. Of course, the base 110 may be manufactured as a base that is integrated with the front and rear patterns (i.e., slot patterns 114 and feeding slot pattern 116).

The base 110 is integrated with the slot patterns 114 in place free of the conductor film 120 on the conductor coated surface 106, and the feeding slot pattern 116. The instant embodiment uses the injection molding to mold the base 110 integrated with the slot patterns 114 and feeding slot pattern 116, and makes the base 110 of resin, such as plastic that is a low dielectric plate material with an operational band. As discussed, the slot patterns 114 forms a slot of the plane antenna, but the injection molding may mold the slot patterns 114 and feeding slot pattern 116 with sub-micron accuracy. For example, the injection molding molds pits on an optical disc (for example, a DVD) having a width of 0.3 $\mu$m, a length of 0.4 $\mu$m, a depth of 0.04 $\mu$m with accuracy. Application of the accurate molding technology to the method of manufacturing the inventive base 110 would be able to make a slot for the antenna 100 with accuracy, in particular, for the small antenna 100 suitable for the short wavelengths. Once a mold for manufacturing the base 110 including the slot patterns 114 and feeding slot pattern 116 is manufactured, the antenna 100 may become mass-produced inexpensively.

Figure 4:
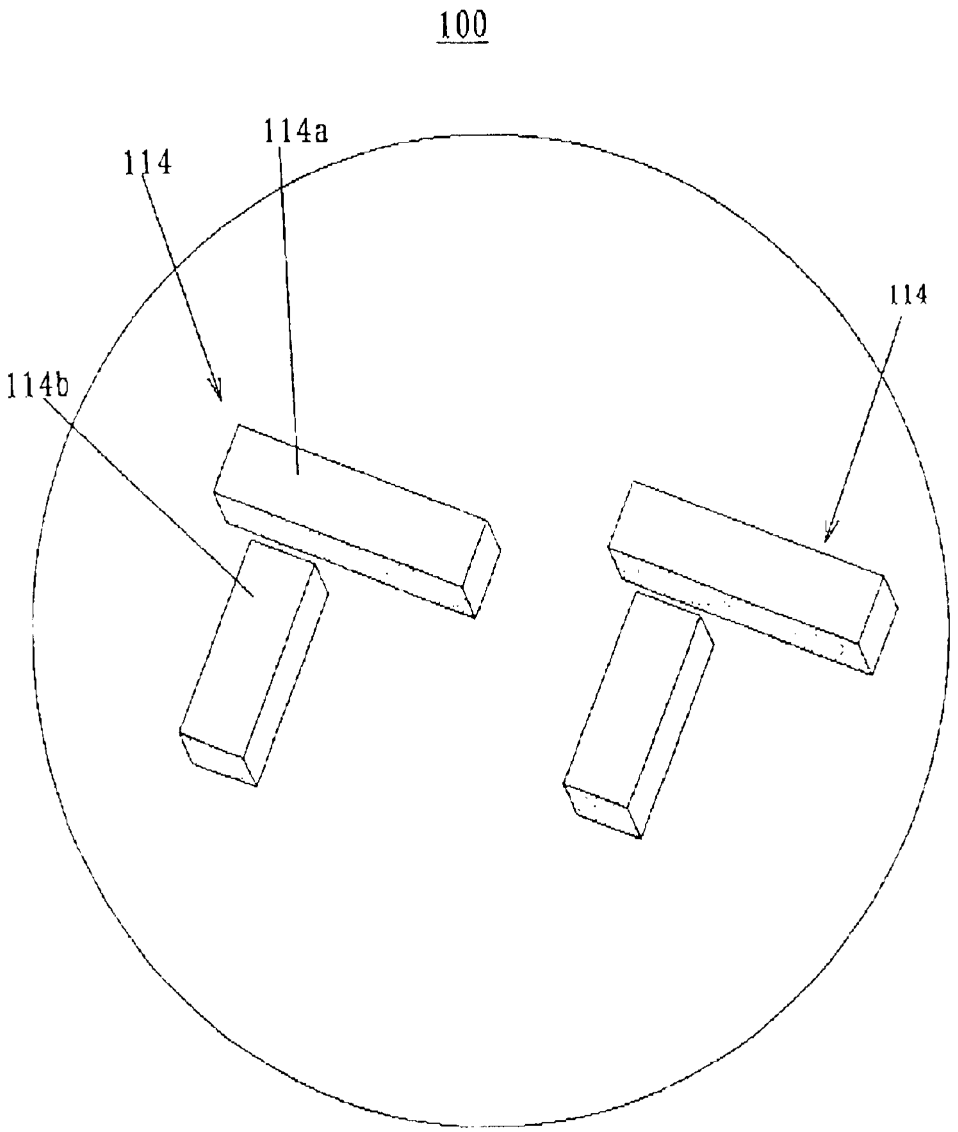
FIG. 4 is a partially enlarged perspective view of a base encircled as a V-shaped area by a solid line in FIG. 1.

The slot pattern 114 is a pattern that serves as a slot of the antenna 100 and located at a region free of the conductor film 120. As shown in FIG. 4, the slot patterns 114 form an array of multiple patterns. Such an array antenna should maintain a size and shape of each array, and a positional relationship among patterns with accuracy. Here, the injection molding forms the slot pattern 114 integrated with the base 110 with accuracy, as discussed, and maintain desired directivity of the antenna 100. As discussed later, the slot 114 has such a convex shape that the resonant slot 114 may maintain its shape, and secures the conductor coated film 120, properly preventing relative positional offsets irrespective of environmental conditions including the thermal expansion, contraction, and their iterations. Therefore, the antenna 100 may maintain the stable antenna property irrespective of environmental changes, such as heat, cold, and moisture absorption. Such an array antenna may be act for a high-frequency array antenna for use with, for example, 50 GHz or higher. A change of an interval in the array antenna becomes $4.2\times10^{-3}$ where the dielectric base has a coefficient of expansion of $7\times10^{-5}$ (/° C.) and, for example, the temperature range is −10° C. to +50° C. The wavelength $\lambda g$ in the dielectric is 3.8 mm where the dielectric constant is 2.5 and the frequency is 50 GHz, and the element interval in the array antenna is calculated to be 0.001 $\lambda g$ as a ratio to the wavelength in the dielectric due to the thermal expansion/contraction. Considering that the size accuracy between the antenna elements is maintained within 0.01 λg, an array antenna having a length of about 10 wavelengths may be configured. This corresponds to an antenna element of about 78 antenna elements maximum, and allows the directivity and gain to be freely designed.

Each slot pattern 114 includes a pair of patterns 114*a* and 114*b* in this embodiment, and the slot patterns 114 are formed spirally or concentrically on the base body 112. Here, FIG. 4 is a partially enlarged perspective view of the base 110 showing a V-shaped area encircled by solid lines in FIG. 1. The shape of the slot patterns 114 shown in FIG. 4 is exemplary, and the slot pattern 114 serves as a slot of the antenna 100. The spiral and concentric shapes provides the antenna 100 with different properties.

The patterns 114*a* and 114*b* are required to have size accuracy of at least 1% of a wavelength in the millimeter wave range. For example, 50 GHz requires the accuracy of scores of micrometers. As discussed, the pattern shape appears as a difference in depth in the optical disc molding, and this should be expressed as an existence or non-existence of the conductor in the antenna 100. For example, the slot antenna makes an opening by removing the conductor from the patterned portion, while the patch antenna leaves the conductor on the patterned portion. A difference in depth is very small such as about 0.03 μm to 0.07 μm in an optical disc. It is practically difficult to distinguish the existence and non-existence of the conductor by the difference in depth. It is noted that the present embodiment forms the patterns 114*a* and 114*b* so that their heights should be from several micrometers to scores of micrometers. As a result, the difference in height may distinguish the existence and non-existence of the conductor. The higher patterns 114*a* and 114*b* are required as the conductor film 120 formed on the base 110 becomes thicker.

Figure 14A:
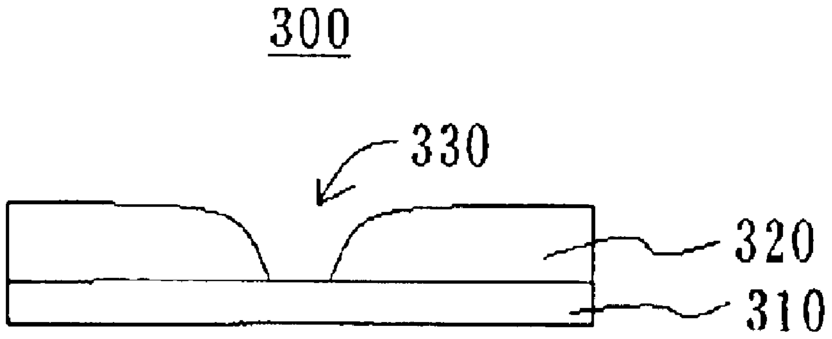
FIG. 14 is a schematic, partial enlarged section for explaining disadvantages of the prior art plane antenna.
Figure 14B:
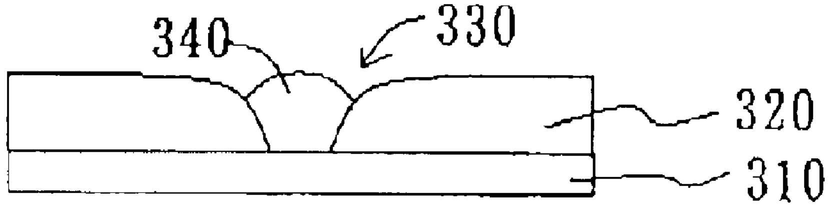
Figure 14C:
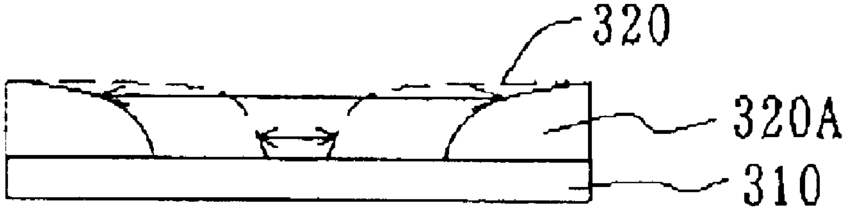

As shown in FIG. 3B, the dielectric base 110 has a convex section at each resonant slot 114. The conductor 120 is arranged around the slot 114, and approximately as high as or level with the slot 114 (so that it forms one flat surface). The conductor 120 has a convex section with a dielectric having the convex section. In the prior art example shown in FIG. 14, the slot 330 collects water 340, changes the size of the slot 330 due to erosion, and cannot maintain the predetermined antenna property for a long time. On the other hand, the plane antenna 100 of this embodiment arranges the slot 114 level with or approximately as high as the conductor 120. The conductor 120 does not form the concave, and both the conductor 120 and the dielectric form a convex shape. Therefore, water is not collected in the slot 114 and thus the slot 114 is less affected by erosion. In this way, the conductor 120 may be rendered as high as the dielectric near the slot 114

As shown in FIG. 3B, $d \leqq h \leqq \lambda g/10$ is preferably met where d is a thickness of the conductor 120 at a location other than the slot 114, λg is a wavelength of an electric wave that propagates the dielectric, and h is a height of the slot 114. The height h of λg/10 or smaller would limit phase offsets among waves emitted from the slot patterns 114, and provide the antenna property with sharp directivity. The convex is higher than the thickness d of the coating conductor so that it may not become a concave for the above reason. Such a plane antenna is especially suitable in the frequency band of 50 GHz or higher of the electric wave. The conductor 120 may have such a thickness d as 3 μm. The range for the height h in the absolute value in the millimeter range may be expressed as $25\ \mu m \leqq h \leqq 250\ \mu m$. $\lambda o = 300/f$ and $\lambda g = \lambda o\ (\sqrt{\epsilon r})$ where λo (mm) is a wavelength in the vacuum, f (GHz) is a frequency, λg (mm) is a wavelength in the dielectric, and εr is a dielectric constant of the dielectric. Tables 1 and 2 summarize a range of materials suitable for the antenna 100.

TABLE 1

| εr = 2<br>f (GHz) | λo (mm) | λg (mm) | λg/10 (μm) |
|---|---|---|---|
| 50 | 6 | 4.2 | 420 |
| 60 | 5 | 3.5 | 350 |
| 75 | 4 | 2.8 | 280 |

TABLE 2

| εr =0 3<br>f (GHz) | λo (mm) | λg (mm) | λg/10 (λm) |
|---|---|---|---|
| 50 | 6 | 3.5 | 350 |
| 60 | 5 | 2.9 | 290 |
| 75 | 4 | 2.3 | 230 |

As discussed, the minimum value of the height h is determined by the film thickness d of the conductor 120 by considering the electromagnetic skin effect of the conductor film thickness d in the working frequency. The skin effect is a phenomenon in which the current density of current flowing through the conductor film 120 concentrates on the surface of the conductor film 120, and thus the small thickness does not always lead to the small resistance in the high frequency. A thickness in which the current density becomes 1/e (0.37 times) as large as that of the conductor surface is referred to as the skin depth, and this value becomes small in inverse proportion to the square root of the frequency. When the conductor film 120 is made of copper, the skin depth is 0.6 μm at 12 GHz and is 0.3 μm at 50 GHz, while the surface resistance is 29 Ω at 12 GHz and is 58 Ω at 50 GHz. Influence of the skin effect should be considered, and ten times as large as the skin depth should be contemplated for a range that mostly propagate the current. In other words, unless the conductor film thickness d maintains at least 3.0 μm at 50 GHz so as to reduce the skin resistance, the transmission loss lowers the antenna's radiant efficiency. The height of the convex is a height measured from the dielectric flat portion, i.e., a height from the bottom of the conductor film 120, and the value should be larger than the thickness d of the conductor film 120. The height that is set to be one-tenth or smaller of the wavelength in the dielectric would not form a resonance circuit in a height direction of the convex, and limit dispersions among radiation phases to be at least λ/10 or smaller.

In the slot 114, the conductor 120 is arranged around and adhered to the dielectric having the convex section. The plane antenna 100 maintains water resistance and stable property due to this adherence. Preferably, a plasma process is conducted for the dielectric to enhance the adherence between the dielectric and the conductor.

The instant embodiment makes the dielectric for forming the slot 114 of a water repellent material. This plane antenna may enhance the water resistance and corrosion resistance due to the water repellent material (such as resin having a low dielectric constant). The resin having a low dielectric constant does not generally have a hydrophilic polar group in a molecule, and is hydrophobic due to the small saturation moisture absorption. It is not porous and thus more water repellent than inorganic materials, such as alumina. Concrete materials include fluorocarbon resin such as ethylene-tetrafluoroethylene copolymer, aromatic series resin, such as polystyrene, and polyolefine resin, such as polypropylene, polyethylene, polymethylpentene, and norbornene. Hydrocarbon resin is particularly preferable when cost and process are considered. A filler and fiber sheet, such as silicon dioxide, may be blended for adjustment of a coefficient of thermal expansion. For use with high frequency of 50 GHz or higher, dimethanonaphthalene resin is preferable.

The dielectric may be made of a material having a coefficient of water absorption of 0.01% or less. Thereby, the antenna 100 may enhance the water resistance and corrosion resistance. That material may include polyolefine resin, such as polypropylene, polyethylene, polymethylpentene, and norbornene.

The dielectric may be made of a material having a coefficient of thermal expansion of $7\times10^{-5}$ or less. Thereby, the antenna 100 and may enhance the water resistance and corrosion resistance. Such a material may, for example, include dimethanonaphthalene resin.

As shown in FIGS. 3A an 3B, the dielectric preferably has a pillar shape in the slot 114. As shown in FIG. 3C, even when the slot 114 erodes, the pillar shape having the approximately constant sectional area may maintain the slot shape and thus stable property for a long time.

The feeding pattern 116 is a pattern for serving as a feeding slot of the antenna 100 and for forming an area free of the conductor film 120. The feeding pattern 116 is, for example, cylindrical-shaped, and formed at a center of the base body 112. When the feeding slot pattern 116 as a feeding slot cannot supply power to a center of the antenna 100, the radiation power pattern has biased property. Therefore, the feeding pattern 116 is provided at a center of the spiral pattern of the slots 114 with accuracy.

The feeding pattern 116 has a convex section in this embodiment. The convex feeder integrated with the plate would provide sufficient impedance matching at the supply side of the antenna, improving the antenna efficiency. It is integrated with the dielectric and thus efficiently manufactured through the integration molding.

A difference between a center of the slot patterns 114 and a center of the feeder is preferably within λ/50. This plane antenna forms an array, and restraint the phase offset of radiation electromagnetic waves from the resonant slot patterns 114 within a permissible range. This would properly adjust the radiation pattern, which is formed by synthesizing these radiation electromagnetic waves.

Alternatively, the pattern 116 having a convex section may serve as an entrance/exit for electric waves. The pattern 116 accords centers of patterns 114, prevents relative positional offsets between front and rear patterns irrespective of environmental conditions including the thermal expansion, contraction, and their iterations, and maintain the stable property. Preferably, the pattern 116 may be concave, but is preferably be convex section for impedance matching using the convex.

The conductor film 120 is a conductor portion provided on the base 110, and has a predetermined thickness so that the conductor coated surface 106 on the base 110 is not affected by the skin effect. The conductor material generally includes copper, silver and nickel, but the conductor film 120 may have a multilayer structure of the conductor if necessary. Although not shown, the conductor film 120 directly formed on the base 110 is (a first conductor) build without electricity, for example, by electroless plating, sputtering, and evaporation, and made of chrome, nickel, copper, silver, gold, etc. The conductor that coats next is (a second conductor) composed of most part of the conductor film 120 formed by electroplating. This conductor is different in current density, electrolyte temperature density, and electric property. As discussed, a thickness of the conductor film 120 or second conductor is controlled by the current value or plating time to avoid the skin effect. Using this layer as a coat layer, a boundary layer with the dielectric for flowing much current may be made of a layer of silver and copper, while a layer located far from the dielectric may apply such a material as gold and nickel taking cost, acid resistance, etc. into consideration.

The plane antenna 100 may coat the conductor film 120 with resin to protect the conductor film 120, which serves as a protective layer of the antenna 100 (although not shown here). Such a protective layer attempts to protect from rust and flaw, and needs to serve as dustproof solution, for example, in installing the antenna 100 without using such a cover material as radome. Although the coat layer should be made of a material of small dielectric loss for the electric property of the antenna 100, UV hardening resin is also applicable.

Figure 13A:
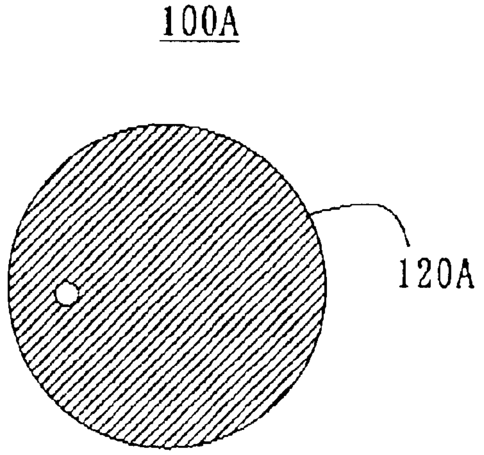
FIG. 13A is a plane view of a patch antenna of one embodiment according to the present invention.
Figure 13B:
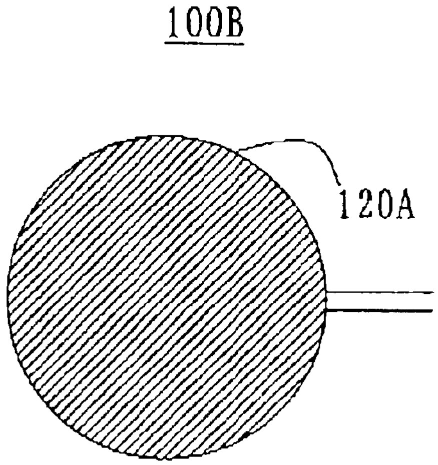
FIG. 13B is a plane view of a patch antenna of another embodiment according to the present invention.
Figure 13C:
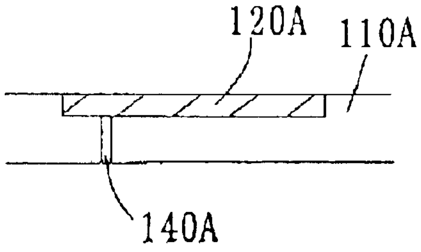
FIG. 13C is a sectional view of FIG. 13A.
Figure 13D:
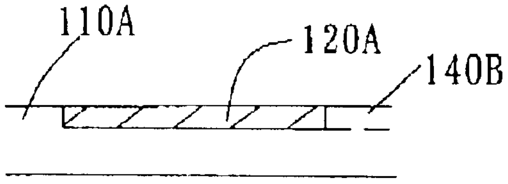
FIG. 13E is a sectional view of a patch antenna of still another embodiment according to the present invention.
Figure 13E:
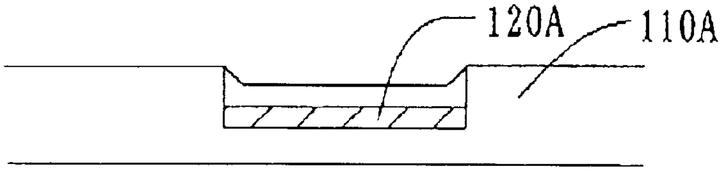

The plane antenna may be a patch antenna for resonating with a pattern in response to feeding to a pattern. A description will be given of the patch antenna of the instant embodiment with reference to FIG. 13. Here, FIGS. 13A and 13B are plane views of patch antennas, respectively. As shown in FIG. 13A, the patch antenna 100A includes plate dielectric 110A, and conductor (coated layer) 120A, and feeder 140A. As shown in FIG. 13B, the patch antenna 10B is the same as the patch antenna 100*a* except it uses the feeder 140B instead of the feeder 140A. The patch antennas 100A and 100B two-dimensionally arrange a multiplicity of convexes, on a surface of the plate dielectric 110A, for forming the predetermined pattern. Each convex on the dielectric 110A surface has the conductor coated film 120A, and an area other than the convexes is free of conductor coated film 120, exposing the dielectric 110A and forming a patch antenna that serves as an array antenna. FIG. 13C is a sectional view of the patch antenna 100A, while FIG. 13D is a sectional view of the patch antenna 100B. As shown in FIGS. 13C and 13D, the patch antenna 100A and 100B may have a flat surface, and overcome the disadvantageous water collection etc., in a manner similar to FIG. 3B. As shown in FIG. 13E, the low hygroscopic resin may be filled when a thickness of the convex is larger than the conductor thickness.

Figure 5:
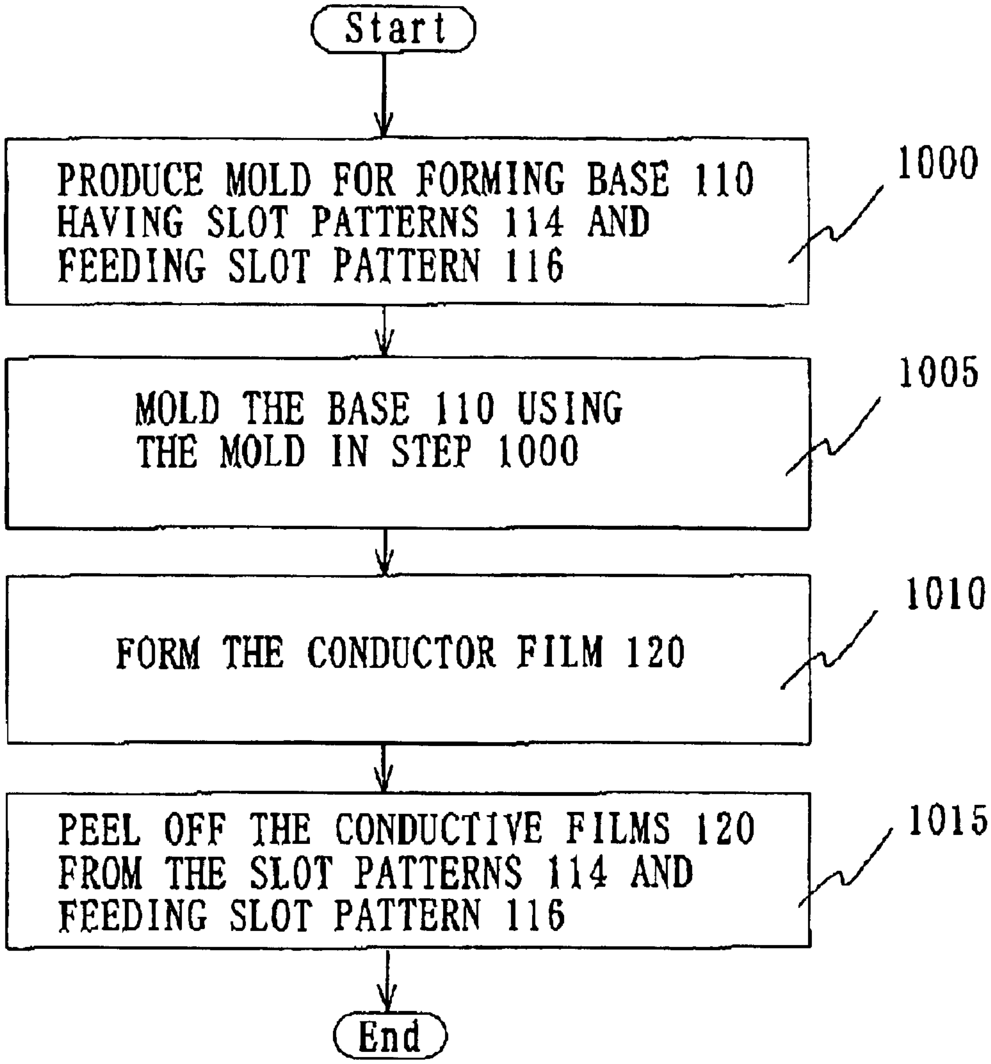
FIG. 5 is a flowchart for explaining a method for manufacturing the antenna shown in FIG. 1.
Figure 8:
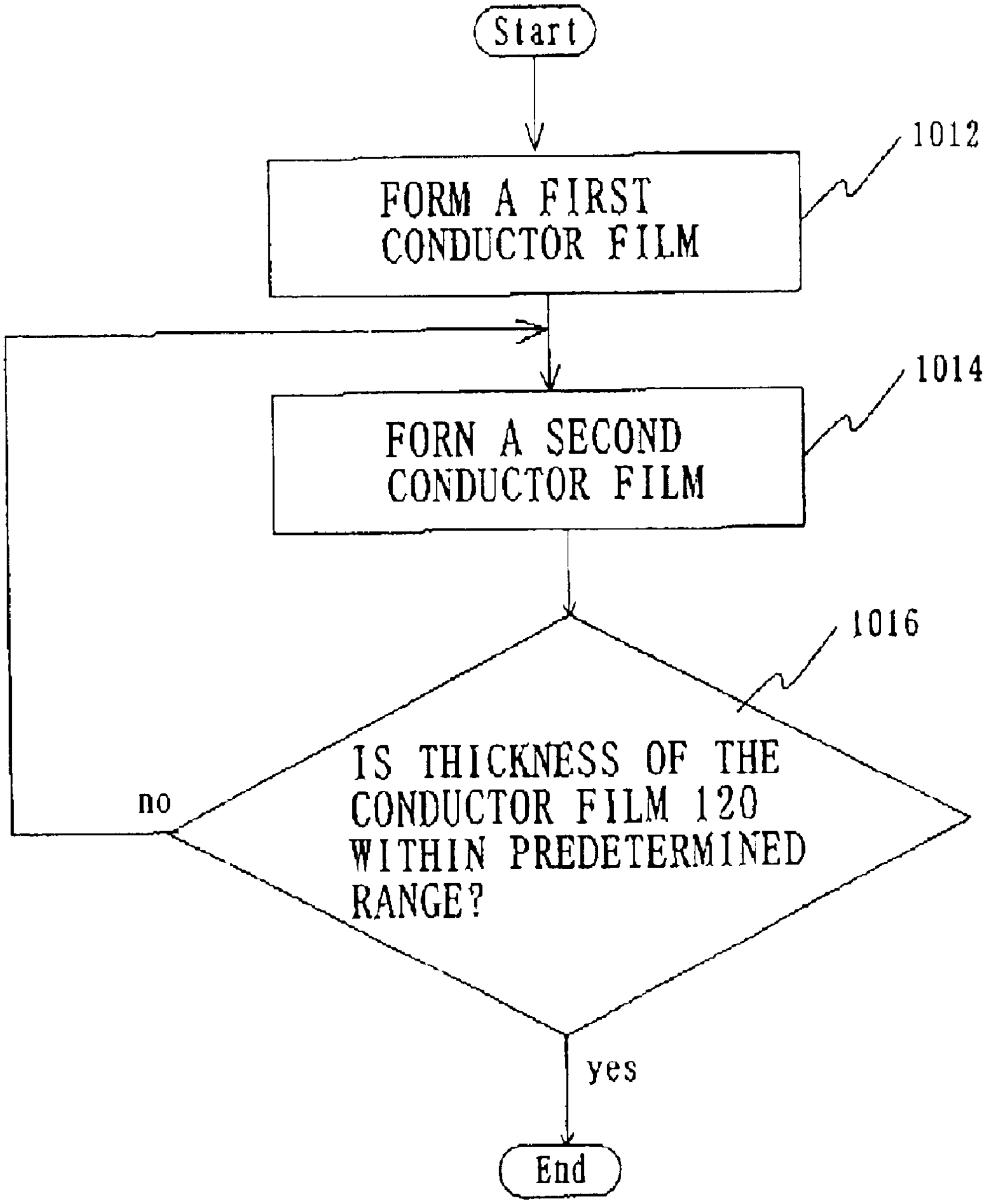
FIG. 8 is a detailed view of step 1010 shown in FIG. 5.
Figure 9A:
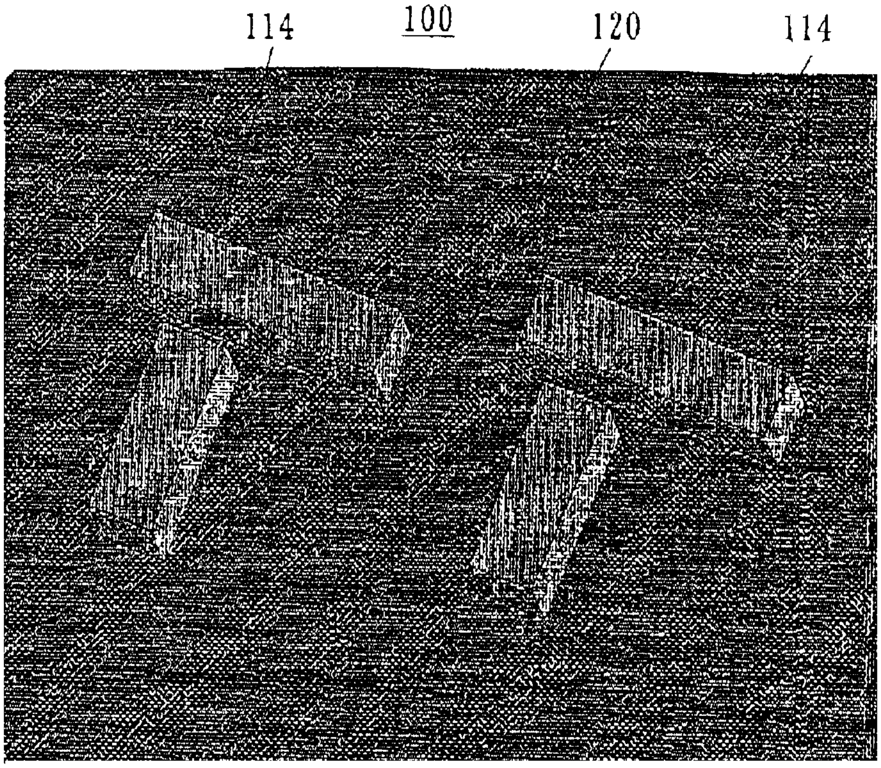
FIG. 9A is a schematic perspective view corresponding to FIG. 4 before a conductor film is peeled off.
Figure 9B:
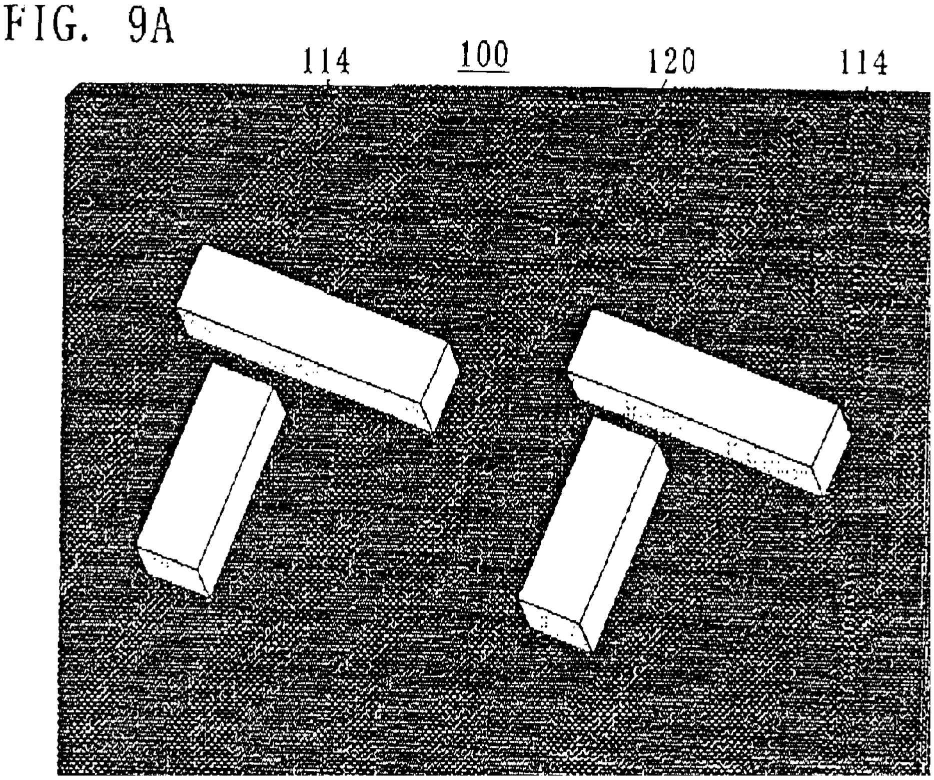
FIG. 9B is a schematic perspective view corresponding to FIG. 4 after the conductor film is peeled off.
Figure 10A:
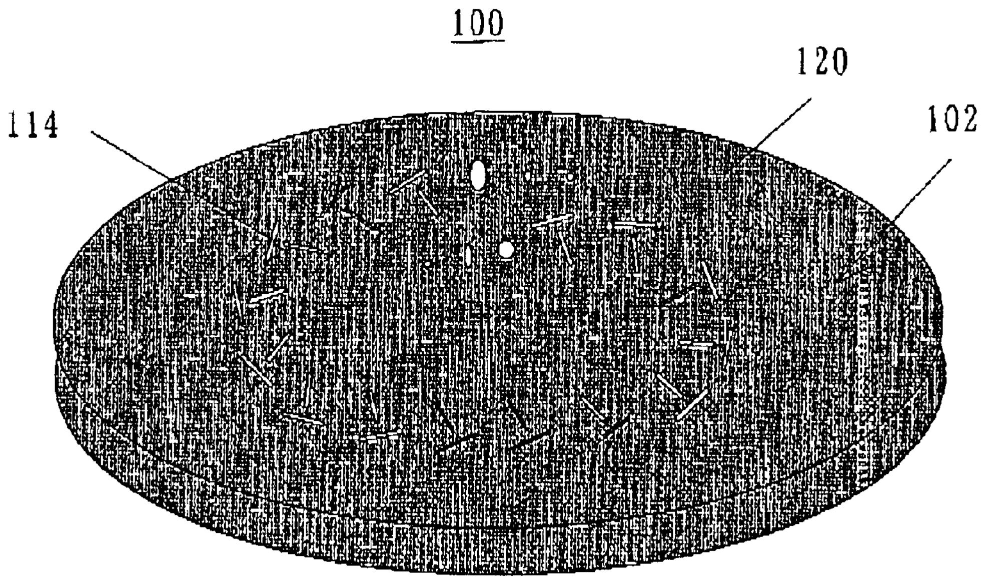
FIG. 10A is a schematic perspective view of an emitting surface of an antenna manufactured by the manufacturing method shown in FIG. 5.
Figure 10B:
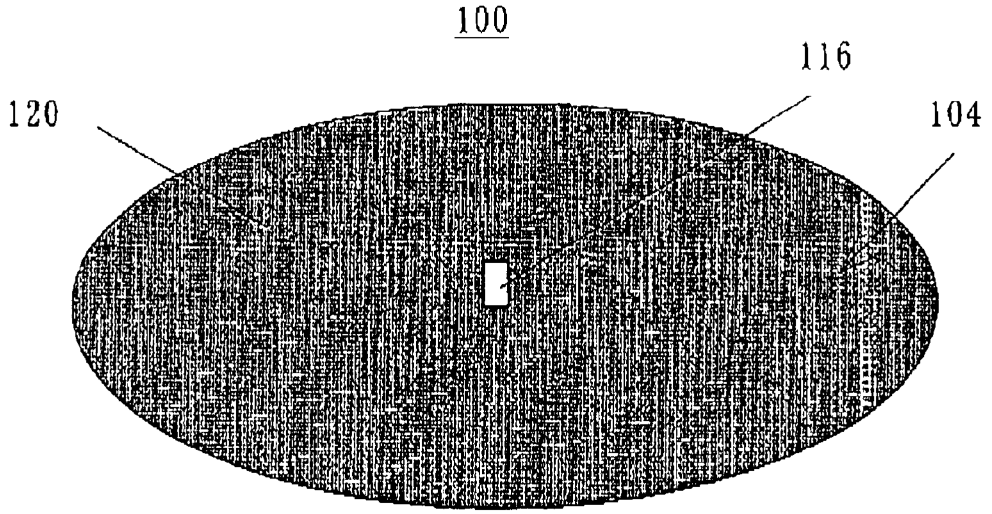
FIG. 10B is a schematic perspective view of the rear surface of the antenna shown in FIG. 10A.

A description will now be given of a manufacturing method of the above antenna 100, with reference to FIGS. 5 to 9. Here, FIG. 5 is a flowchart for explaining a method for manufacturing the antenna 100 shown in FIG. 1. FIG. 6 is a detailed view of step 1000 shown in FIG. 5. FIG. 7 is a detailed view of step 1005 shown in FIG. 5. FIG. 8 is a detailed view of step 1010 shown in FIG. 5. FIG. 9A is a schematic perspective view corresponding to FIG. 4 before the conductor film 120 is peeled off. FIG. 9B is a schematic perspective view corresponding to FIG. 4 after the conductor film 120 is peeled off FIG. 10A is a schematic perspective view of the emitting surface 102 of the antenna 100 manufactured by the manufacturing method shown in FIG. 5. FIG. 10B is a schematic perspective view of the rear surface 104 of the antenna 100 shown in FIG. 10A. FIGS. 9 and 10 exemplarily show a portion painted in black in which the conductor film 120 is formed in order to clarify the existence and non-existence of the conductor film 120. Although the instant embodiment manufactures the plane antenna 100 by the injection molding, the present invention does not eliminate the presswork.

As discussed, step 1000 makes a mold for molding the base 110 having the slot patterns 114 and feeding pattern 116 in order to mold the base 110 of the antenna 100 using injection molding. The step 1000 forms two molds for the emitting surface 102 side and feeder surface 104 side of the base 110. For example, an upper mold forms concave/convex part including a concave portion corresponding to the resonance slot patterns 114 at its cavity side.

Figure 6A:
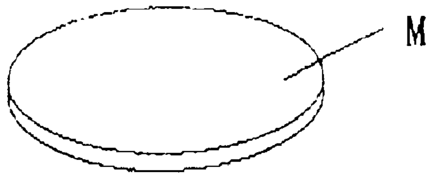
FIG. 6 is a detailed view of step 1000 shown in FIG. 5.
Figure 6B:
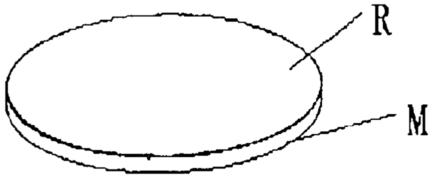
Figure 6C:
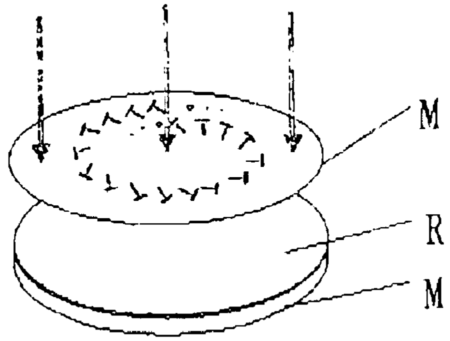
Figure 6D:
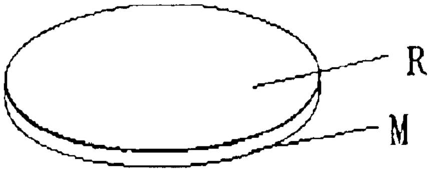

First, a master M is prepared (see FIG. 6A) onto which the resist is applied in order to describe the step 1000 in detail. The master uses one having a flat glass surface, onto which exposure resist R is, in turn, applied (see FIG. 6B). Then, the master, on which the resist has been applied, is exposed through a patterned mask "m" using the exposure apparatus (see FIG. 6C). The patterned mask "m" indicates the slot patterns 114 or feeding slot pattern 116 that has been designed by a CAD, and preferably successfully simulated. FIG. 6C shows the patterned mask "m" forming the slot patterns 114 for the emitting surface 102.

Figure 6E:
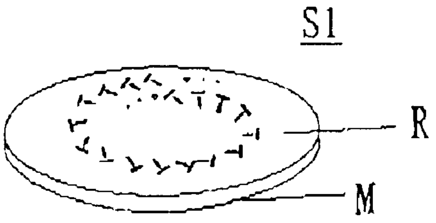

After the exposure (see FIG. 6D), the master M is developed so that the slot patterns 114 or feeding slot pattern 116 appear. More specifically, the development of the exposed master M would dissolve only the exposed or unexposed portions in the developer, and thus the resist layer is removed from the exposed or unexposed portions. Thereby, the (inversed) pattern corresponding to the slot patterns 114 or feeding slot pattern 116 is formed as shown in FIG. 6E. This pattern is made slightly larger than the actual slot patterns 114 or feeding slot pattern 116. The size is determined taking into consideration shrinkage after molding. Notably, when the set coefficient of contraction is different from the actual one, the physical size of the antenna becomes so different that the antenna cannot provide desired property. The pattern corresponding to the slot patterns 114 or feeding slot pattern 116 identifies existence and non-existence of the conductor using a difference in height. Therefore, it is noted that the instant embodiment sets a height of the pattern formed on the master M to be about 1% of a use wavelength of the antenna 100, i.e., or about scores of micrometers for the slot patterns 114 or feeding slot pattern 116. In this respect, the instant embodiment is different from a method for manufacturing an optical disc. After the master M is developed, a mold $S_1$ is available by electroplating of a chrome film. Although FIG. 6 shows only the mold $S_1$ at the emitting surface 102, a mold $S_1$ for the feeder surface 104 side is also prepared.

As discussed, these molds $S_1$ and $S_2$ prepared in these steps form a convex as the pattern on the emitting surface 102 and feeder surface 104, which may, in turn, form the pattern of a convex section on the base 110. Once the molds $S_1$ and $S_2$ are prepared for the base 110 including the emitting surface 102 and the feeder surface 104, the antenna 100 may be mass-produced inexpensively.

Figure 7A:
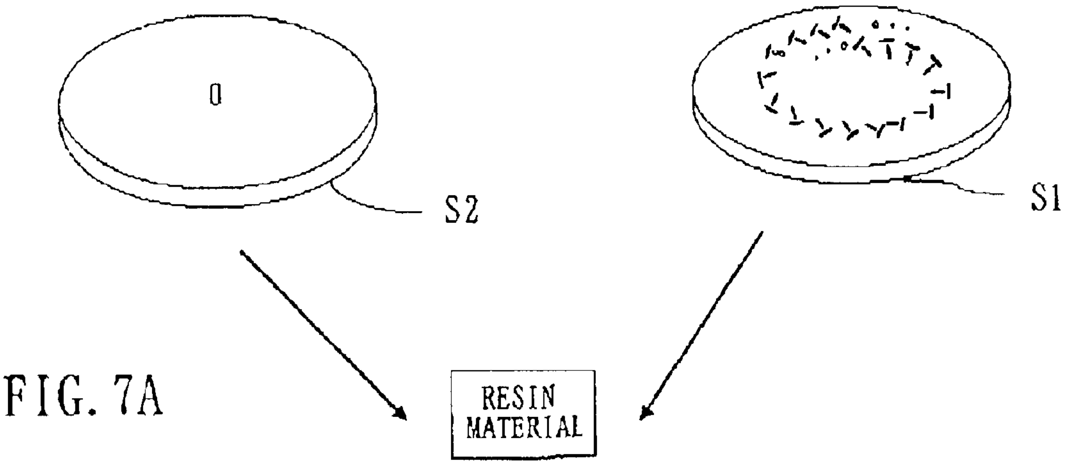
FIG. 7 is a detailed view of step 1005 shown in FIG. 5.
Figure 7B:
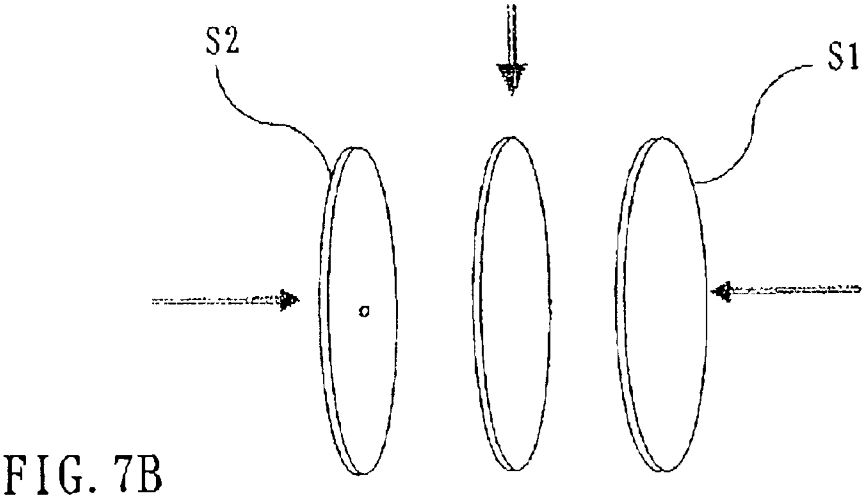
Figure 7C:
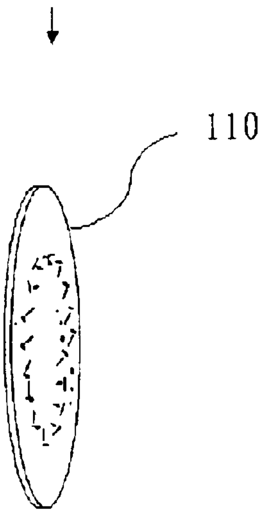

Referring now to FIG. 7A, step 1005 molds the base 110 using the molds $S_1$ and $S_2$. The base 110 is mold by supplying the molding resin material to a known injection machine, heating the injection machine up to about 350° C. so as to dissolve the material uniformly, injecting into and filling the stamper molds $S_1$ and $S_2$ with high pressure, and setting it up (see FIG. 7B). FIG. 7B omits the injection machine. This forms the base 110 integrated with the emitting surface 102 and feeder surface 104 (see FIG. 7C). The slot patterns 114 and 116 are arranged as an array pattern composed of rectangular parallelepipeds. The injection molding may accurately reproduce the size and arrangement of the slot patterns 114 and feeding slot pattern 116, and thus produce the accurate antenna 100 with the base 110 having desired directivity.

It is noted in the step 1005 that a center of the mold for the emitting surface 102 side should be aligned with that of the mold for the feeder surface 104 side with accuracy. The radiant power exhibits biased property when power is not fed properly to a center of the spiral slot patterns 114. Therefore, it is important that the centers of these molds $S_1$ and $S_2$ should be aligned with each other in order to manufacture the antenna 100 having sufficiently symmetrical slots. Although the instant embodiment simultaneously uses the molds $S_1$ and $S_2$ to mold the patterns on the emitting surface 102 and the feeder surface 104, the molds $S_1$ and $S_2$ may be separately used for injection molding to separately form two bases having the emitting surface 102 and the feeder surface 104, as discussed above, and sticking together these two bases into the base 110. Of course, it is preferable that these two bases each have a thickness half of a thickness of the base 110 that integrates the slot patterns 114 with feeding slot pattern 116.

The conductor film 120 is formed on the base 110 formed on the step 1005 (step 1010). Firstly, referring to FIG. 8, (the first) conductor film is formed using an electroless process, such as a conductor film formation using an evaporation, sputtering, and electroless plating (step 1012). Such a conductor is made of copper, chrome, nickel, silver, gold, etc. Then, (the second) conductor is formed on the first conductor so that the conductor has a predetermined thickness in order to avoid the skin effect. It may be formed, for example, by electroplating, and the predetermined thickness of the second conductor for avoiding the skin effect of the conductor film 120 is available by controlling the current value and plating time (or electrification time) (steps 1014 to 1016). The electroplating is a method to obtain the electrolyte deposition of a target metal film on the object surface by dipping into a solution including the target metal ions the object as a cathode that is an reducing electrode, and flowing DC current in a forward direction between the cathode and a soluble or insoluble anode (as an oxidizing electrode). The thickness of the conductor film 120 is recognizable by directly or indirectly measuring the elapsed time after electrification, the current value during the electrification, etc. A detection of the thickness of the conductor film 120 using the elapsed time after electrification and the current value during the electrification may use data that has been obtained through simulation. In general, it is expected that the current value becomes lower as the conductor film 120 is thinner. Such simulation would take such parameters as the metal ion concentration, the solution temperature, humidity, etc. into consideration. The formation of the conductor is understandable by those skilled in the art, and a detailed description thereof will be omitted.

After the step 1010 (i.e., steps 1012 to 1016), the conductor film 120 if uniformly formed on the slot patterns 114 and feeding slot pattern 116 and the base body 112. In this case, the slot patterns 114 and the feeding slot pattern 116 are conductor-coated, convex/concave patterns, from which no antenna pattern is obtained (see FIG. 9A). The conductor film 12 is then peeled off from the slot patterns 114 and the feeding slot pattern 116 (step 1015). Such step 1015 may use such mechanical means as grinding and polishing to peel off the conductor film 120 deposited on the slot patterns 114 and the feeding slot pattern 116. The conductor 120 may be as high as the dielectric by simultaneously removing a tip of the dielectric convex and a metal conductor coating the tip of the dielectric surface. Although the present invention does not eliminate peeling off of only the conductor 120, the instant embodiment removes both the dielectric and conductor 120 for manufacturing easiness. In this case, as discussed, the dielectric preferably has a pillar shape so as not to change the slot size.

The insufficient flatness of the emitting surface 102 would result in biased polishing and poor peel-off. Therefore, it is important that the molding condition does not cause deformation The workability improves when the conductor film 120 is made thicker by transferring from au electroless plating state to an electroplating state to allow for slight unsymmetrical wear. In view of a relationship between the thickness of the conductor film 120 and the heights of the slot patterns 114 and feeding slot pattern 116, as the thickness becomes larger the height should be larger accordingly. Therefore, it is effective to execute the polishing process in the plating stage of the electroless process in which the conductor is relatively thin, instead of executing it after the electroplating. This also may lower the slot patterns 114 and feeding slot pattern 116.

After the steps 1000 to 1015, the antenna 100 is formed as a slot antenna with predetermined areas (i.e., the slot and feeding slot) on the base 110 free of the conductor film 120, as shown in FIGS. 9B and 10. Although FIG. 9B shows only the slot patterns 114, the conductor 120 is removed from the feeding pattern 116 on the feeder surface 104, as shown in FIG. 10B.

Although the instant embodiment illustrates the slot antenna with the slot patterns 114 uncovered with the conductor, a manufacturing method of the patch antenna is similar except that the slot patterns 114 are formed as the conductor film. The side of the base 110 is coated with the conductor film 120, but an open-ended antenna is available by removing the conductor from the side through polishing Although not described in detail, it is natural to coat the antenna in order to protect the antenna, and careful coating is required for the emitting surface 102 side so that the electric property does not deteriorate.

The manufacturing method of this embodiment may provide an antenna with sharp directivity and good property since the injection molding uniformly determines a size of each slot pattern 114 and an arrangement the slot patterns 114 with accuracy. The manufacturing method of this embodiment may also reduce manufacture cost due to the good mass-productivity.

Figure 11:
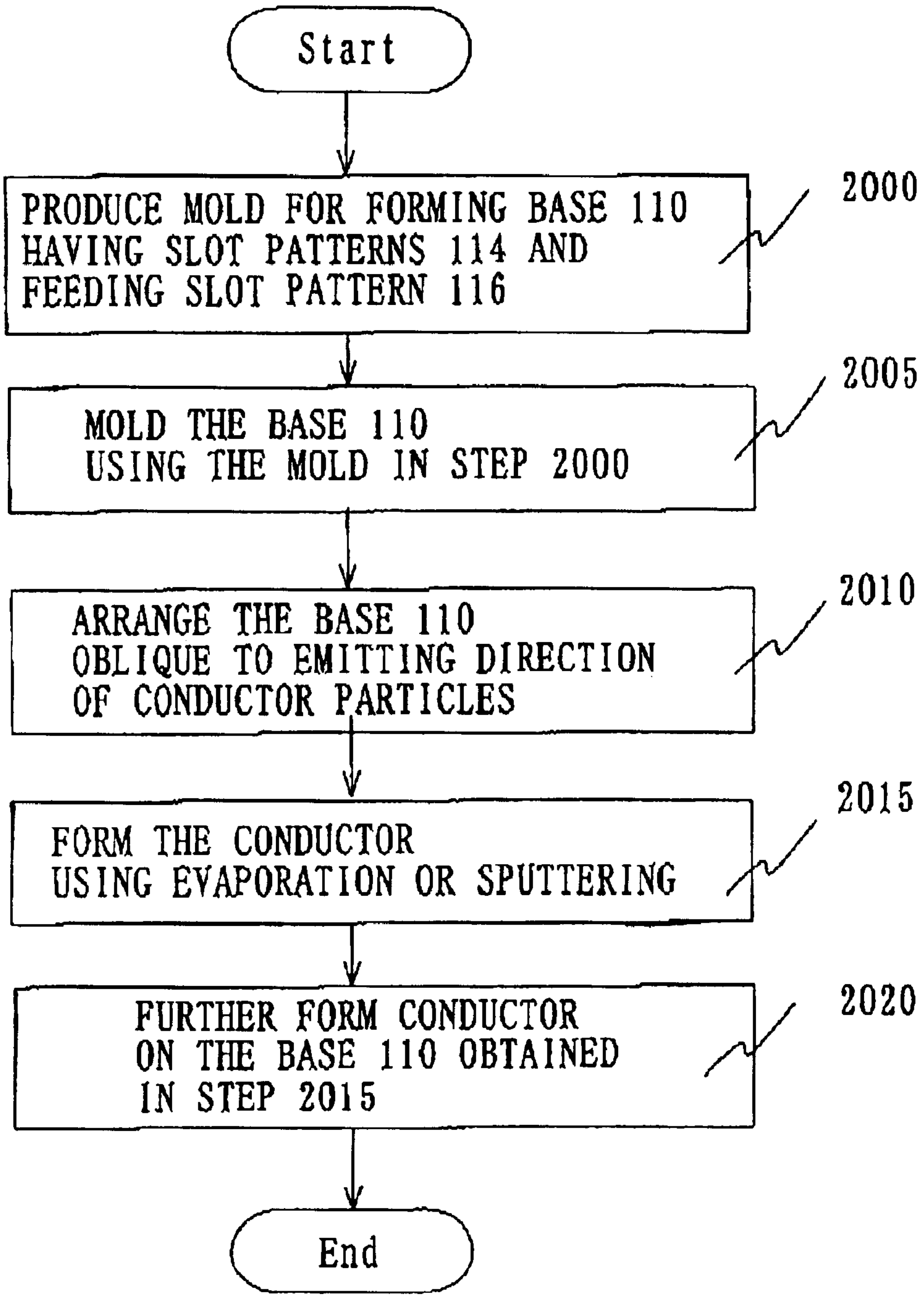
FIG. 11 is a flowchart showing another method for manufacturing the antenna according to the present invention.
Figure 12:
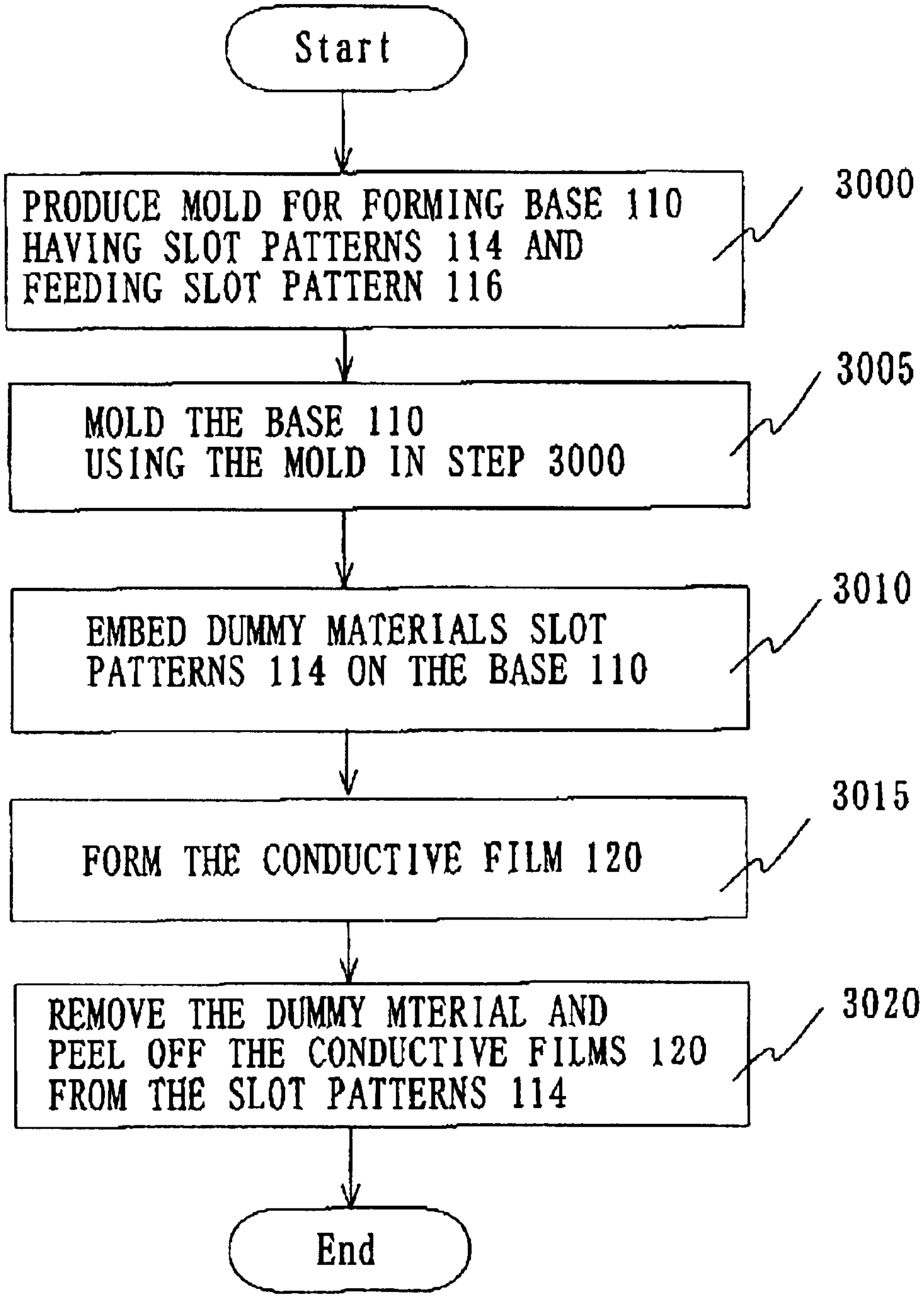
FIG. 12 is a flowchart showing still another method for manufacturing the antenna according to the present invention.

The above embodiment contemplates the convex slot patterns 114, but each slot pattern 114 may be concave. The concave pattern cannot be formed by polishing, but may be formed in the stage for forming the conductor film 120 in an alternative manner. A description will now be given of such a method with reference to FIGS. 11 and 12. Here, FIGS. 11 and 12 are flowcharts showing alternative methods for manufacturing the antenna according to the present invention. A description of the same step as in the above method will be omitted.

As discussed, similar to the step 1000, step 2000 makes a mold for molding the base 110 having the slot patterns 114 and feeding pattern 116 in order to mold the base 110 of the antenna 100 using injection molding. This step forms two molds for the emitting surface 102 side and feeder surface 104 side of the base 110. The master has convex part corresponding to the slot patterns 114 and feeding pattern 116, unlike the step 1000, and this part is formed as a concave pattern on the base 110. As apparent from the following steps, it is preferable that this convex part is formed so that each slot pattern 114 in the base 110 is deep to some extent. This depth exhibits an effect in that the conductor is hard to coat the bottom of each slot pattern 114.

The base 110 is molded using the mold (step 2005). As a result, the base 110 integrated with the slot patterns 114 and feeding slot pattern 116 is formed. Alternatively, the base 110 may be formed by sticking together two separately formed bases each having the slot patterns 114 or the feeding slot pattern 116, as discussed. The slot patterns 114 and 116 are each formed as a concave rectangular parallelepiped pattern. The injection molding may reproduce the size and arrangement of the slot patterns 114 and feeding slot pattern 116 with accuracy. It is noted in this step that a center of the mold for the emitting surface 102 side should be aligned with that of the mold for the feeder surface 104 side with accuracy. The radiant power exhibits biased property when power is not fed properly to a center of the spiral slot patterns 114. Therefore, it is important that the centers of these molds should be aligned with each other in order to manufacture the antenna 100 having sufficiently symmetrical slots.

The conductor film 120 is formed on the base 110 formed on the step 1005. Firstly, (the first) conductor film is formed on the base 110 using an electroless process, such as evaporation and sputtering. Notably, the bottoms of the slot patterns 114 and feeding slot pattern 116 should keep away from the conductor film deposition. Accordingly, the inventive method arranges the base 110 oblique to an incoming direction of conductor particles so that the bottoms of the slot patterns 114 and feeding slot pattern 116 may be located behind the incoming conductor particles (step 2010). The conductor is then ejected using the evaporation or sputtering in this state (step 2015). When an ejection opening of the conductor is close to the base 110, the base 110 includes an uneven film thickness, Such a conductor is made of chrome, nickel, silver, gold, etc. Then, (the second) conductor is formed on the first conductor so that the conductor has a predetermined thickness in order to avoid the skin effect (step 2020). The second conductor is formed, for example, by evaporation or sputtering of aluminum.

After the steps 2000 to 2015, the antenna 100 is formed as a slot antenna with predetermined areas (i.e., the slot and feeding slot) on the base 110 free of the conductor film 120.

Referring now to FIG. 11, the steps 2000 to 2002 may be replaced with the following method. Similar to the above steps, step 3000 makes a mold for molding the base 110 having the slot patterns 114 and feeding pattern 116 in order to mold the base 110 of the antenna 100 using injection molding. This step forms two molds for the emitting surface 102 side and feeder surface 104 side of the base 110. The master has convex part corresponding to the slot patterns 114 and feeding pattern 116, and this part is formed as a concave pattern on the base 110. Alternatively, the base 110 may be formed by sticking together two separately formed bases each having the slot patterns 114 or the feeding slot pattern 116, as discussed.

The step 3005 molds the base 110 using the mold, consequently forming the base 110 integrated with the slot patterns 114 and feeding slot pattern 116. The slot patterns 114 and 116 are each formed as a concave rectangular parallelepiped pattern. The injection molding may reproduce the size and arrangement of the slot patterns 114 and feeding slot pattern 116 with accuracy. It is noted in this step that a center of the mold for the emitting surface 102 side should be aligned with that of the mold for the feeder surface 104 side with accuracy. The radiant power exhibits biased property when power is not fed properly to a center of the spiral slot patterns 114. Therefore, it is important that the centers of these molds should be aligned with each other in order to manufacture the antenna 100 having sufficiently symmetrical slots.

Then, the step 3010 embeds a dummy member into the slot patterns 114 on the base 110. While the above methods devises a formation of a conductor film 120 on the base 110 in order to prevent the conductor film 120 from being formed on the slot patterns 114, the instant embodiment achieves the object by embedding a dummy member into concaves on the base 110. The dummy member embedded into the concaves in the slot patterns 114 is removed after the conductor film is formed, whereby the conductor film 120 is removed. Therefore, the dummy member should be processed so that it is left on the concaves and not left on the flat portions. In addition, in taking the dummy member after the conductor film 120 is formed, it is preferable that the dummy member bursts and takes out the conductor film 120. The dummy member preferably uses a material that is solid at the room temperature and turns into gas and swells when heated, and it is made, for example, of petrolatum.

The step 3015 forms the conductor film 120 on the base 110 formed by the step 3010. As discussed for the steps 1012 to 1016 in FIG. 8, the conductor film is formed on the base 110 using an electroless process, such as a conductor film formation using an evaporation, sputtering, and electroless plating. Such a conductor is made of copper, chrome, nickel, silver, gold, etc. Then, the conductor is formed on the first conductor so that the conductor has a predetermined thickness in order to avoid the skin effect. It may be formed, for example, by electroplating, and the predetermined thickness of the second conductor for avoiding the skin effect of the conductor film 120 is available by controlling the current value and plating time. As the conductor forming method has been discussed above, a detailed description will be omitted The step 3020 then peels off the conductor film 120 from the slot patterns 114 by removing the dummy member. As discussed, when the dummy member uses petrolatum etc., heating of the base 110 forming the conductor film 120 would evaporate and burst petrolatum enclosed by the conductor film 120, thereby peeling off the conductor film 120.

After the steps 3000 to 3020, the antenna 100 is formed as a slot antenna with predetermined areas (i.e., the slot and feeding slot) on the base 110 free of the conductor film 120.

The above manufacturing methods thus use the injection molding to form the base body 112 integrated with the slot patterns 114 and feeding slot pattern 116. Each slot pattern 114 serves as a slot in the plane antenna, and the injection molding may mold the predetermined pattern in the submicron order. Therefore, the above manufacturing methods may form the slot with good size accuracy, and a small antenna suitable for short wavelengths. A production of the base 110 using the injection molding would result in easy mass production of an antenna inexpensively, once a mold for the dielectric including a predetermined pattern is produced.

The inventive antenna 100 is a small plane antenna suitable for the millimeter wave band (i.e., with a frequency of 30 to 300 GHz and a wavelength of 1 to 10 mm). In particular, since this band essentially has physical property having such large oxygen absorbed attenuation that it is hard to reach far, the instant invention is applicable to various radio communication systems which are require to transmit large information content inexpensively. The antenna 100 is suitable, for instance, for short-range communication systems, radio LANs, domestic interior radio networks, etc.

Further, the present invention is not limited to these preferred embodiments, and various variations and modifications may be made without departing from the scope of the present invention.

The inventive plane antenna and its manufacturing method use the injection molding to integrate the base with the predetermined pattern free of the conductor on the base. The predetermined pattern may form a slot for the plane antenna with good size accuracy. The injection molding for producing dielectric would enable the antenna to be inexpensively mass-produced once a mold for the dielectric having the predetermined pattern is prepared. The injection molding may form the predetermined pattern in the micron order, and provide a small antenna suitable for short wavelengths.

What is claimed is:

1. A method for manufacturing a plane antenna that coats dielectric with conductor and forms a pattern free of the conductor using a surface of the dielectric which is otherwise coated with conductor and is made of material having a coefficient of water absorption of 0.01% or less, said method comprising the step of:

molding the dielectric to form the pattern therein through injection molding using a mold that includes the pattern, forming a first conductor film on the dielectric formed by said molding step, using electroless plating, evaporation or sputtering; and forming a second conductor film on the dielectric on which the first conductor film has been formed by said step of forming a first conductor film.

2. A method according to claim 1, wherein the second conductor film is formed by electroplating, and the step of forming the second conductor film includes controlling a film thickness of the second conductor film formed by the electroplating.

3. A method according to claim 1, wherein the pattern has a concave shape, and the step of forming the first conductor film uses evaporation or sputtering, and includes the step of arranging a patterned surface oblique to an ejection direction of a material of the conductor in the evaporation or sputtering.

4. A method according to claim 3, wherein the step of forming the second conductor film uses evaporation or sputtering of aluminum.

5. A plane antenna comprising a plate dielectric and a conductor that coats a surface of the dielectric, the plate antenna forming a resonant slot of a predetermined pattern at a predetermined position uncovered with the conductor, wherein the dielectric is made of a material having a coefficient of water absorption of 0.01% or less, and has a convex section forming the pattern at the predetermined position, wherein the conductor is arranged approximately as high as the dielectric around the dielectric having the convex section and forms a convex section together with the dielectric having the convex section; and wherein said plane antenna serves as a high frequency wave array antenna for use with 50 GHz or higher.

6. A plane antenna comprising a plate dielectric and a conductor that coats a surface of the dielectric, the plate antenna forming a resonant slot of a predetermined pattern at a predetermined position on the dielectric uncovered with the conductor, wherein the dielectric is made of material having a coefficient of water absorption of 0.01% or less, and has a convex section forming the pattern at the predetermined position, wherein the conductor is arranged approximately as high as the dielectric around the dielectric having the convex section, and forms a convex section together with the dielectric having the convex section, and wherein $d \leqq h \leqq \lambda g/10$ is satisfied where d is a thickness of the conductor at a location other than the predetermined position, $\lambda g$ is a wavelength of an electric wave, and h is a height of the dielectric having the convex section.

7. A plane antenna according to claim 6, wherein the wave has a frequency of 50 GHz or higher.

8. A plane antenna comprising a plate dielectric and a conductor that coats a surface of the dielectric, the plate antenna forming a resonant slot of a predetermined pattern at a predetermined position on the dielectric uncovered with the conductor, wherein the dielectric is made of material having a coefficient of water absorption of 0.01% or less, and has a convex section forming the pattern at the predetermined position, wherein the conductor is arranged approximately as high as the dielectric around the dielectric having the convex section, and forms a convex section together with the dielectric having the convex section, and wherein $25\ \mu m \leqq h \leqq 250\ \mu m$ is satisfied where h is a height of the dielectric having the convex section.

* * * * *